(12) United States Patent
Zhang et al.

(10) Patent No.: US 11,163,741 B2
(45) Date of Patent: Nov. 2, 2021

(54) TABLE CONNECTION METHOD IN DISTRIBUTED DATABASE SYSTEM AND DISTRIBUTED DATABASE SYSTEM

(71) Applicant: HUAWEI TECHNOLOGIES CO., LTD., Guangdong (CN)

(72) Inventors: Guoqiang Zhang, Beijing (CN); Lin Huang, Beijing (CN); Dongwang Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 16/169,585

(22) Filed: Oct. 24, 2018

(65) Prior Publication Data
US 2019/0057123 A1 Feb. 21, 2019

Related U.S. Application Data

(63) Continuation of application No. PCT/CN2016/113407, filed on Dec. 30, 2016.

(30) Foreign Application Priority Data

Apr. 25, 2016 (CN) .......................... 201610263605.9

(51) Int. Cl.
*G06F 16/22* (2019.01)
*H04L 29/08* (2006.01)
(Continued)

(52) U.S. Cl.
CPC .......... *G06F 16/2282* (2019.01); *G06F 16/21* (2019.01); *G06F 16/221* (2019.01);
(Continued)

(58) Field of Classification Search
CPC .................................................. G06F 16/2282
See application file for complete search history.

(56) References Cited

U.S. PATENT DOCUMENTS 8,055,683 B2    11/2011    Brodhun et al.
2006/0085437 A1*    4/2006    Brodhun ............... G06F 16/288
(Continued)

FOREIGN PATENT DOCUMENTS

CN    101174267 A    5/2008
CN    102323947 A    1/2012
(Continued)

OTHER PUBLICATIONS

Extended European Search Report issued in European Application No. 16900305.0 dated Nov. 12, 2018, 7 pages.
(Continued)

*Primary Examiner* — Van H Oberly
(74) *Attorney, Agent, or Firm* — Fish & Richardson P.C.

(57) ABSTRACT

The present disclosure relates to example table connection methods, devices, and systems. In one example method, data that is sent by a coordinator node and that is in a first target column in a first data table is stored by a data node in a local memory. The data node receives a table connection request. When first data in the first target column is the same as second data in a second target column, the data node connects data in a row in which the first data is located to data in a row in which the second data is located. The data node sends a connection result to the coordinator node.

18 Claims, 6 Drawing Sheets

(51) Int. Cl.
*G06F 16/2455* (2019.01)
*G06F 16/21* (2019.01)
*G06F 16/25* (2019.01)

(52) U.S. Cl.
CPC .......... *G06F 16/2455* (2019.01); *G06F 16/25* (2019.01); *H04L 29/08* (2013.01)

(56) References Cited

U.S. PATENT DOCUMENTS

| | | |
|---|---|---|
| 2008/0306904 A1 | 12/2008 | Fukuda et al. |
| 2013/0318043 A1 | 11/2013 | Mujumdar et al. |
| 2015/0169656 A1 | 6/2015 | Ito et al. |
| 2015/0234895 A1 | 8/2015 | Erdogan et al. |

FOREIGN PATENT DOCUMENTS

| | | |
|---|---|---|
| CN | 103765391 A | 4/2014 |
| CN | 104135505 A | 11/2014 |
| CN | 104899225 A | 9/2015 |
| CN | 105245375 A | 1/2016 |
| CN | 105264521 A | 1/2016 |
| WO | 2012170049 A1 | 12/2012 |

OTHER PUBLICATIONS

Office Action issued in Chinese Application No. 201610263605.9, dated Jun. 24, 2019, 9 pages (With English translation).
International Search Report and Written Opinion issued in International Application No. PCT/SN2016/113407 dated Apr. 6, 2017, 18 pages.

* cited by examiner

| DN 1 | | |
|---|---|---|
| 1 | Lily | 20 |
| 2 | | |
| 3 | | |

| | | |
|---|---|---|
| 1 | Lily | 90 |

| DN 2 | | |
|---|---|---|
| 1 | | |
| 2 | Lucy | 25 |
| 3 | | |

| | | |
|---|---|---|
| 2 | Lucy | 88 |

| DN 3 | | |
|---|---|---|
| 1 | | |
| 2 | | |
| 3 | Li Lei | 22 |

| | | |
|---|---|---|
| 3 | Meimei | 89 |

FIG. 4

TABLE CONNECTION METHOD IN DISTRIBUTED DATABASE SYSTEM AND DISTRIBUTED DATABASE SYSTEM

CROSS-REFERENCE TO RELATED APPLICATIONS

This application is a continuation of International Application No. PCT/CN2016/113407, filed on Dec. 30, 2016, which claims priority to Chinese Patent Application No. 201610263605.9, filed on Apr. 25, 2016. The disclosures of the aforementioned applications are hereby incorporated by reference in their entireties.

TECHNICAL FIELD

The present disclosure relates to the field of information technologies, and in particular, to a table connection method in a distributed database system and the distributed database system.

BACKGROUND

In a distributed database system, nodes may be classified into a coordinator node and a data node according to functions. The data node is configured to store data in a data table. As a bridge of communication between a client and the data node, the coordinator node is configured to temporarily store data sent by the client and the data node, and transmit data between the client and the data node. In the distributed database system, data is usually stored by using a data structure of a share nothing (share nothing) system. In the data structure of the share nothing system, data in a data table is distributed on each data node in a unit of row, and data in a data table on each data node may be stored in a unit of row, or may be stored in a unit of column.

Based on the data structure of the share nothing system in the distributed database system, in a method, used in a distributed database, for connecting data in two data tables, because the data tables are distributed on different data nodes, a coordinator node needs to gather, in the local, all the data in the two tables from a data node, and then performs local connection. Because an amount of transmitted data is relatively large, a network response time is long, a process in which the coordinator node processes data connection is relatively slow, a plenty of resources of the coordinator node need to be occupied, and service performance is relatively poor.

SUMMARY

To resolve problems in an existing data table connection method that a network response time is long, resource usage is relatively large, and service performance is poor, embodiments of the present disclosure provide a table connection method in a distributed database system and the system. The technical solutions are as follows:

According to a first aspect, an embodiment of the present disclosure provides a data table connection method in a distributed database system, where the distributed database system includes a data node and a coordinator node, the method is applied to the data node, and the method includes: storing, in a local memory, data that is sent by the coordinator node and that is in a first target column in a first data table, where the first target column is a column that is in the first data table and that is connected to another data table more than preset times; receiving a table connection request sent by the coordinator node, where the table connection request includes an identifier of the first data table, an identifier of the first target column, an identifier of a second data table, and an identifier of a second target column in the second data table; obtaining the first target column and the second target column from the local memory according to the table connection request; connecting data in a row in which first data in the first target column is located to data in a row in which second data is located, so as to obtain a connection result, where the first data is any data in the first target column, and the second data is the same as the first data; and sending the connection result to the coordinator node. In this process, without a need to send locally stored data to the coordinator node, each data node can locally connect data in the first data table to data in the second data table according to data in the first target column and data in the second target column. Therefore, not only an amount of transmitted data is reduced, a network response time is shortened, and service performance is better, but also occupied storage resources of the data node can be reduced.

With reference to the first aspect, in a first possible implementation of the first aspect, the method further includes: when a distributed column in the first data table is different from the first target column, receiving, by the data node, data that is sent by the coordinator node and that is in the distributed column, where the distributed column is a column in which a row identifier of the first data table is located; and storing, in the local memory, the data in the distributed column. The data node sends both the data in the distributed column and the connection result to the coordinator node, so that when processing the connection result, the coordinator node can find, according to the distributed column, a data node on which an empty row identifier is located, and further obtain data in a row in which the empty row identifier is located, so as to improve accuracy of a connected data table.

With reference to the first aspect or the first implementation of the first aspect, in a second possible implementation of the first aspect, the method further includes: receiving a data obtaining request sent by the coordinator node, where the data obtaining request indicates that there is an empty row in an integrated data table of the coordinator node, the integrated data table is obtained by the coordinator node by integrating a connection result sent by at least one data node, and the data obtaining request includes an empty row identifier; obtaining data in a row in which the empty row identifier is located; and sending the data in the row in which the empty row identifier is located to the coordinator node. The data node sends the data in the row in which the empty row identifier is located to the coordinator node, so that the coordinator node can fill the empty row in the integrated data table, thereby enabling data in the connected data table to be more complete.

According to a second aspect, a table connection method in a distributed database system is provided, where the distributed database system includes a data node and a coordinator node, the method is applied to the coordinator node, and the method includes: obtaining a first target column from a first data table, where the first target column is a column that is connected to another data table more than preset times; sending data in the first target column to the data node; sending a table connection request to the data node, where the table connection request includes an identifier of the first data table, an identifier of the first target column, an identifier of a second data table, and an identifier of a second target column in the second data table, and the table connection request is used to trigger the data node to return a result of connecting data in the first data table to data in the second data table; and receiving the connection result sent by the data node. In this process, the coordinator node does not need to receive data sent by each data node, or store data on each node. Therefore, not only an amount of transmitted data is reduced, a network response time is shortened, and service performance is better, but also occupied storage resources of the coordinator node can be reduced.

With reference to the second aspect, in a first possible implementation of the second aspect, the method further includes: when a distributed column in the first data table is different from the first target column, sending data in the distributed column to the data node, where the distributed column is a column in which a row identifier of the first data table is located. The data in the distributed column is sent to the data node, so that when the connection result is being processed, a data node on which an empty row identifier is located can be found according to the distributed column, and data in a row in which the empty row identifier is located can be further obtained, so as to improve accuracy of a connected data table.

With reference to the second aspect or the first possible implementation of the second aspect, in a second possible implementation of the second aspect, the method further includes: integrating a connection result sent by at least one data node, so as to obtain an integrated data table; if there is an empty row in the integrated data table, sending a data obtaining request to a data node corresponding to the empty row, where the data obtaining request includes an empty row identifier, and the empty row identifier is determined according to the distributed column in the first data table; receiving data that is sent by the data node corresponding to the empty row and that is in a row in which the empty row identifier is located; and adding the data in the row in which the empty row identifier is located to a row that is in the integrated data table and that is corresponding to the empty row identifier, so as to obtain a new data table. The data that is sent by the data node and that is in the row in which the empty row identifier is located is received, so that the empty row in the integrated data table can be filled, thereby enabling data in the connected data table to be more complete.

According to a third aspect, a table connection method in a distributed database system is provided, where the distributed database system includes a data node and a coordinator node, the method is applied to the data node, and the method includes: storing, in a local memory, data that is sent by the coordinator node and that is in a first target row in a first data table, where the first target row is a row that is in the first data table and that is connected to another data table more than preset times; receiving a table connection request sent by the coordinator node, where the table connection request includes an identifier of the first data table, an identifier of the first target row, an identifier of a second data table, and an identifier of a second target row in the second data table; obtaining the first target row and second data in the second target row from the local memory according to the table connection request; connecting data in a column in which first data in the first target row is located to data in a column in which the second data is located, so as to obtain a connection result, where the first data is any data in the first target row, and the second data is the same as the first data; and sending the connection result to the coordinator node. In this process, without a need to send locally stored data to the coordinator node, each data node can locally connect data in the first data table to data in the second data table according to data in the first target row and data in the second target row. Therefore, not only an amount of transmitted data is reduced, a network response time is shortened, and service performance is better, but also occupied storage resources of the data node can be reduced.

With reference to the third aspect, in a first possible implementation of the third aspect, the method further includes: when a distributed row in the first data table is different from the first target row, receiving data that is sent by the coordinator node and that is in the distributed row, where the distributed row is a row in which a column identifier of the first data table is located; and storing, in the local memory, the data in the distributed row. Both the distributed row and the connection result are sent to the coordinator node, so that when processing the connection result, the coordinator node can find, according to the distributed row, a data node on which an empty column identifier is located, and further obtain data in a column in which the empty column identifier is located, so as to improve accuracy of a connected data table.

With reference to the third aspect or the first possible implementation of the third aspect, in a second possible implementation of the third aspect, the method further includes: receiving a data obtaining request sent by the coordinator node, where the data obtaining request indicates that there is an empty column in an integrated data table of the coordinator node, the integrated data table is obtained by the coordinator node by integrating a connection result sent by at least one data node, and the data obtaining request includes an empty column identifier; obtaining data in a column in which the empty column identifier is located; and sending the data in the column in which the empty column identifier is located to the coordinator node. The data node sends the data in the column in which the empty column identifier is located to the coordinator node, so that the coordinator node can fill the empty column in the integrated data table, thereby enabling data in the connected data table to be more complete.

According to a fourth aspect, a table connection method in a distributed database system is provided, where the distributed database system includes a data node and a coordinator node, the method is applied to the coordinator node, and the method includes: obtaining a first target row from a first data table, where the first target row is a row that is connected to another data table more than preset times; sending data in the first target row to the data node; sending a table connection request to the data node, where the table connection request includes an identifier of the first data table, an identifier of the first target row, an identifier of a second data table, and an identifier of a second target row in the second data table, and the table connection request is used to trigger the data node to return a result of connecting data in the first data table to data in the second data table; and receiving the connection result sent by the data node. In this process, the coordinator node does not need to receive data sent by each data node, or store data on each node. Therefore, not only an amount of transmitted data is reduced, a network response time is shortened, and service performance is better, but also occupied storage resources of the coordinator node can be reduced.

With reference to the fourth aspect, in a first possible implementation of the fourth aspect, the method further includes: when a distributed row in the first data table is different from the first target row, sending data in the distributed row to the data node, where the distributed row is a row in which a column identifier of the first data table is located. The data in the distributed row is sent to the data node, so that when the connection result is being processed, a data node on which an empty column identifier is located can be found according to the distributed row, and data in a column in which the empty column identifier is located can be further obtained, so as to improve accuracy of a connected data table.

With reference to the fourth aspect or the first possible implementation of the fourth aspect, in a third possible implementation of the fourth aspect, the method further includes: integrating a connection result sent by at least one data node, so as to obtain an integrated data table; if there is an empty column in the integrated data table, sending a data obtaining request to a data node corresponding to the empty column, where the data obtaining request includes an empty column identifier, and the empty column identifier is determined according to the distributed row in the first data table; receiving data that is sent by the data node corresponding to the empty column and that is in a column in which the empty column identifier is located; and adding the data in the column in which the empty column identifier is located to a column that is in the integrated data table and that is corresponding to the empty column identifier, so as to obtain a new data table. The data that is sent by the data node and that is in the column in which the empty column identifier is located is received, so that the empty column in the integrated data table can be filled, thereby enabling data in the connected data table to be more complete.

According to a fifth aspect, a data node is provided, where the data node is located in a distributed database system, the distributed database system includes the data node and a coordinator node, and the data node is configured to execute the table connection method in the distributed database system according to the first aspect. For specific operations executed by the data node, refer to the first aspect, and the first to the second possible implementations of the first aspect.

According to a sixth aspect, a coordinator node is provided, where the coordinator node is located in a distributed database system, the distributed database system includes a data node and the coordinator node, and the coordinator node is configured to execute the table connection method in the distributed database system according to the second aspect. For specific operations executed by the coordinator node, refer to the second aspect, and the first to the second possible implementations of the second aspect.

According to a seventh aspect, a data node is provided, where the data node is located in a distributed database system, the distributed database system includes the data node and a coordinator node, and the data node is configured to execute the table connection method in the distributed database system according to the third aspect. For specific operations executed by the data node, refer to the third aspect, and the first to the second possible implementations of the third aspect.

According to an eighth aspect, a coordinator node is provided, where the coordinator node is located in a distributed database system, the distributed database system includes a data node and the coordinator node, and the coordinator node is configured to execute the table connection method in the distributed database system according to the fourth aspect. For specific operations executed by the coordinator node, refer to the fourth aspect, and the first to the second possible implementations of the fourth aspect.

According to a ninth aspect, a computing device is provided, and the computing device may be a data node and includes: a processor, a memory, a communications interface, and a bus, where the memory, the processor, and the communications interface are connected by using the bus. The computing device is configured to execute the table connection method in the distributed database system according to the first aspect. For specific operations executed by the computing device, refer to the first aspect, and the first to the second possible implementations of the first aspect.

According to a tenth aspect, a computing device is provided, and the computing device may be a coordinator node and includes: a processor, a memory, a communications interface, and a bus, where the memory, the processor, and the communications interface are connected by using the bus. The computing device is configured to execute the table connection method in the distributed database system according to the second aspect. For specific operations executed by the computing device, refer to the second aspect, and the first to the second possible implementations of the second aspect.

According to an eleventh aspect, a computing device is provided, and the computing device may be a data node and includes: a processor, a memory, a communications interface, and a bus, where the memory, the processor, and the communications interface are connected by using the bus. The computing device is configured to execute the table connection method in the distributed database system according to the third aspect. For specific operations executed by the computing device, refer to the third aspect, and the first to the second possible implementations of the third aspect.

According to a twelfth aspect, a computing device is provided, and the computing device may be a coordinator node and includes: a processor, a memory, a communications interface, and a bus, where the memory, the processor, and the communications interface are connected by using the bus. The computing device is configured to execute the table connection method in the distributed database system according to the fourth aspect. For specific operations executed by the computing device, refer to the fourth aspect, and the first to the second possible implementations of the fourth aspect.

According to a thirteenth aspect, a distributed database system is provided, where the system includes a data node and a coordinator node, and the data node in the system is configured to execute the table connection method in the distributed database system according to the first aspect. For specific operations executed by the data node in the system, refer to the first aspect, and the first to the second possible implementations of the first aspect. The coordinator node in the system is configured to execute the table connection method in the distributed database system according to the second aspect. For specific operations executed by the coordinator node in the system, refer to the second aspect, and the first to the second possible implementations of the second aspect.

According to a fourteenth aspect, a distributed database system is provided, where the system includes a data node and a coordinator node, and the data node in the system is configured to execute the table connection method in the distributed database system according to the third aspect. For specific operations executed by the data node in the system, refer to the third aspect, and the first to the second possible implementations of the third aspect. The coordinator node in the system is configured to execute the table connection method in the distributed database system according to the fourth aspect. For specific operations executed by the coordinator node in the system, refer to the fourth aspect, and the first to the second possible implementations of the fourth aspect.

The memory in the first aspect to the fourteenth aspect is at least one of a volatile memory or a non-volatile memory (for example, a hard disk, storage). The preset times are preset by the coordinator node, and are used to measure a connection frequency of each column in the first data table. When setting the preset times, the coordinator node obtains, according to times of connecting each column in the first data table to another data table, an average value of times of connecting each column to the another data table, and uses any value greater than the average value as the preset times; or the coordinator node obtains, according to times of connecting each column in the first data table to another data table, a sum of times of connecting each column to the another data table, obtains a product of the sum and a preset percentage, and uses any value greater than the product as the preset times.

Beneficial effects of the technical solutions provided in some embodiments of the present disclosure are as follows:

A data node locally stores a first target column that is selected by a coordinator node and that is in a first data table, and locally and directly connects data in the first target column to data in a second target column after receiving a table connection request for connecting the first target column in the first data table to the second target column in a second data table. Because data in a data table stored on a data node does not need to be sent to the coordinator node, not only an amount of transmitted data is reduced, a network response time is shortened, and service performance is improved, but also occupied storage resources of the coordinator node are reduced and storage space is reduced.

BRIEF DESCRIPTION OF DRAWINGS

To describe the technical solutions in some embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

FIG. 4 is a schematic diagram of manners of storing a data table on different data nodes according to another embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
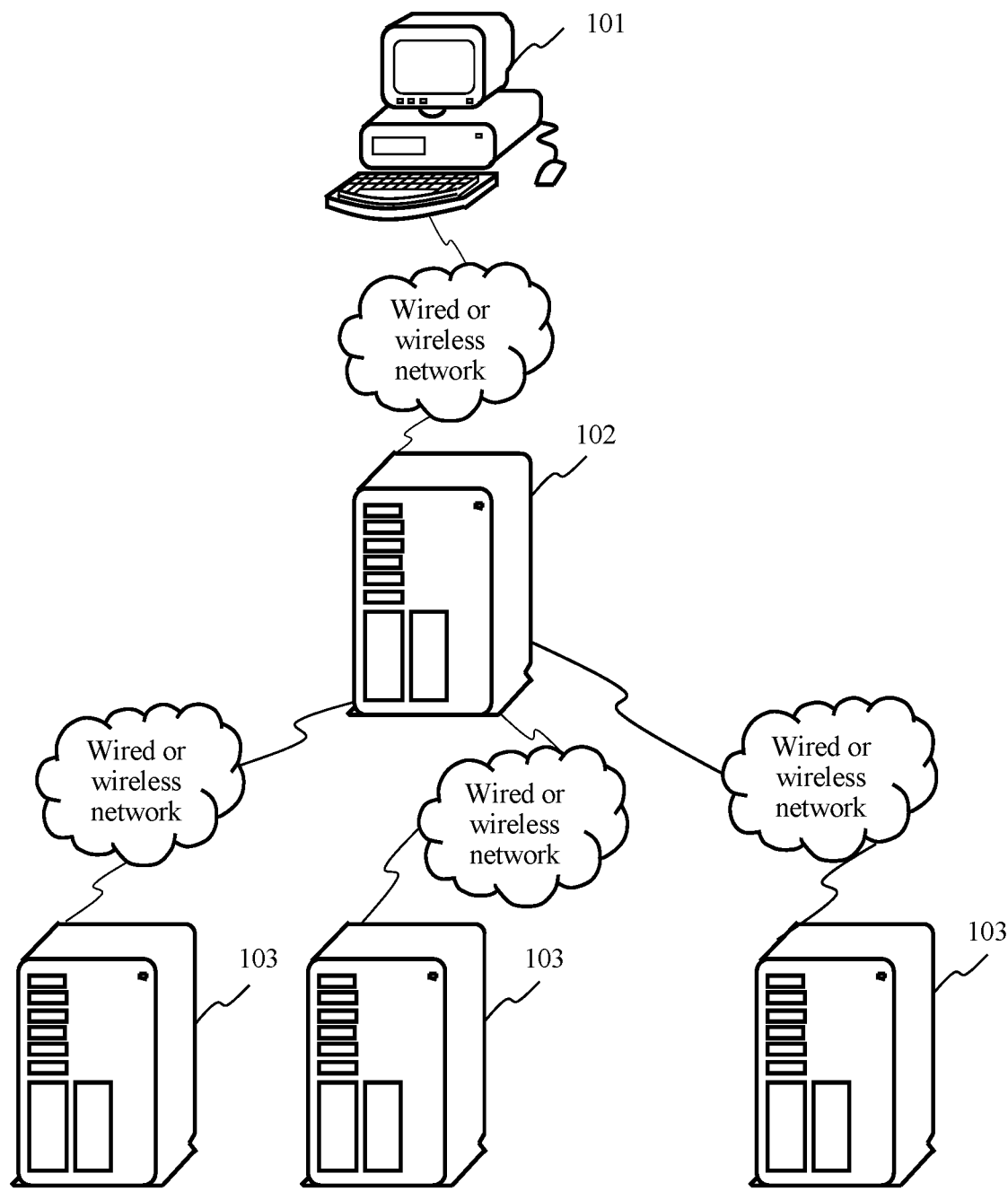
FIG. 1 is a structural diagram of a distributed database system according to an embodiment of the present disclosure.

FIG. 1 is a structural diagram of a distributed database system. The distributed database system includes a client 101, a coordinator node 102, and a data node 103.

The client 101 may be a smartphone, a tablet computer, a desktop computer, or the like. The client has a function of sending and receiving data, can send various data such as an instruction and a data table to the coordinator node 102, and can further receive various data sent by the coordinator node 102. As a bridge of communication between the client 101 and the data node 103, the coordinator node 102 can transmit data between the client 101 and each data node 103, temporarily store data of the client 101, and further process data sent by the data node. The coordinator node 102 may be an independent computing device, or may be a computer cluster including multiple computing devices. The data node 103 has a data storage capability and can store the data of the client 101. The data node 103 may be an independent computing device, or may be a computer cluster including multiple computing devices.

The client 101 may communicate with the coordinator node 102 by using a wired network or a wireless network, and the coordinator node 102 may communicate with the data node 103 by using a wired network or a wireless network.

In the distributed database system, data storage structures mainly include share everything (a data structure of a share everything system), share nothing (a data structure of a share nothing system), and shared disk (a data structure of a shared disk system). Share everything is usually used only for a single client, and has a relatively poor parallel processing capability. Although a parallel processing capability of shared disk can be improved by increasing a quantity of data nodes, when a memory port is saturated, better performance cannot be obtained even when a data node is added. In share nothing, data nodes are mutually independent and process respective data, and a parallel capability and a processing capability are very good. Because the share nothing data structure is obviously better than another data storage structure, in the distributed database system, the share nothing data structure is usually used to store data.

Based on the structure of the distributed database system shown in FIG. 1, an example in which the share nothing data structure is used for storage is used. Currently, when data tables are being connected, a coordinator node determines a data table with a smaller data amount from two to-be-connected data tables, and sends the data table with a smaller data amount to each data node. Each data node connects data in another data table stored in a local memory to that in the data table with a smaller data amount, so as to obtain a connection result, and sends the connection result to the coordinator node. The coordinator node integrates at least one connection result. In this manner, each data node needs to store a complete data table, a network response time is relatively long, storage resources of the data node are occupied, and service performance is relatively poor.

An embodiment of the present disclosure provides a distributed database system, and the distributed database system includes a data node 103 and a coordinator node 102.

The coordinator node 102 is configured to: obtain a first target column from a first data table, where the first target column is a column that is connected to another data table more than preset times; and send data in the first target column to the data node.

The data node 103 is configured to store, in a local memory, the data that is sent by the coordinator node and that is in the first target column in the first data table.

The coordinator node 102 is further configured to send a table connection request to the data node, where the table connection request includes an identifier of the first data table, an identifier of the first target column, an identifier of a second data table, and an identifier of a second target column in the second data table.

The data node 103 is further configured to: obtain the first target column and the second target column from the local memory according to the table connection request; and connect data in a row in which first data in the first target column is located to data in a row in which second data is located, so as to obtain a connection result, where the first data is any data in the first target column, and the second data is the same as the first data.

The coordinator node 102 is further configured to receive the connection result sent by the data node.

In another embodiment of the present disclosure, the coordinator node 102 is further configured to: when a distributed column in the first data table is different from the first target column, send data in the distributed column to the data node, where the distributed column is a column in which a row identifier of the first data table is located.

The data node 103 is further configured to receive the data that is sent by the coordinator node and that is in the distributed column.

In another embodiment of the present disclosure, the coordinator node 102 is further configured to: integrate a connection result sent by at least one data node, so as to obtain an integrated data table; and if there is an empty row in the integrated data table, send a data obtaining request to the data node, where the data obtaining request includes an empty row identifier, and the empty row identifier is determined according to the distributed column in the first data table.

The data node 103 is further configured to: receive the data obtaining request sent by the coordinator node; obtain data in a row in which the empty row identifier is located; and send the data in the row in which the empty row identifier is located to the coordinator node.

The coordinator node 102 is further configured to: receive the data that is sent by the data node and that is in the row in which the empty row identifier is located; and add the data in the row in which the empty row identifier is located to a row that is in the integrated data table and that is corresponding to the empty row identifier, so as to obtain a new data table.

According to the system provided in this embodiment of the present disclosure, a data node locally stores a first target column that is selected by a coordinator node and that is in a first data table, and locally and directly connects data in the first data table to data in a second data table after receiving a table connection request for connecting the first target column in the first data table to a second target column in the second data table. Because data in a data table stored on a data node does not need to be sent to the coordinator node, not only an amount of transmitted data is reduced, a network response time is shortened, and service performance is improved, but also occupied storage resources of the coordinator node and the data node are reduced and storage space is reduced.

An embodiment of the present disclosure provides a distributed database system, and the distributed database system includes a coordinator node 102 and a data node 103.

The coordinator node 102 is configured to: obtain a first target row from a first data table, where the first target row is a row that is connected to another data table more than preset times; and send data in the first target row to the data node.

The data node 103 is configured to store, in a local memory, the data that is sent by the coordinator node and that is in the first target row in the first data table.

The coordinator node 102 is further configured to send a table connection request to the data node, where the table connection request includes an identifier of the first data table, an identifier of the first target row, an identifier of a second data table, and an identifier of a second target row in the second data table.

The data node 103 is further configured to: obtain the first target row and second data in the second target row from the local memory according to the table connection request; and connect data in a column in which first data in the first target row is located to data in a column in which the second data is located, so as to obtain a connection result, where the first data is any data in the first target row, and the second data is the same as the first data.

The coordinator node 102 is further configured to receive the connection result sent by the data node.

In another embodiment of the present disclosure, the coordinator node 102 is further configured to: when a distributed row in the first data table is different from the first target row, send data in the distributed row to the data node, where the distributed row is a row in which a column identifier of the first data table is located.

The data node 103 is configured to receive the data that is sent by the coordinator node and that is in the distributed row.

In another embodiment of the present disclosure, the coordinator node 102 is further configured to: integrate a connection result sent by at least one data node, so as to obtain an integrated data table; and if there is an empty column in the integrated data table, send a data obtaining request to the data node, where the data obtaining request includes an empty column identifier, and the empty column identifier is determined according to the distributed row in the first data table.

The data node 103 is further configured to: receive the data obtaining request sent by the coordinator node; obtain data in a column in which the empty column identifier is located; and send the data in the column in which the empty column identifier is located to the coordinator node.

The coordinator node 102 is further configured to: receive the data that is sent by the data node and that is in the column in which the empty column identifier is located; and add the data in the column in which the empty column identifier is located to a column that is in the integrated data table and that is corresponding to the empty column identifier, so as to obtain a new data table.

According to the system provided in this embodiment of the present disclosure, a data node locally stores a first target column that is selected by a coordinator node and that is in a first data table, and locally and directly connects data in the first data table to data in a second data table after receiving a table connection request for connecting the first target column in the first data table to a second target column in the second data table. Because data in a data table stored on a data node does not need to be sent to the coordinator node, not only an amount of transmitted data is reduced, a network response time is shortened, and service performance is improved, but also occupied storage resources of the coordinator node and the data node are reduced and storage space is reduced.

Figures 2, 3:
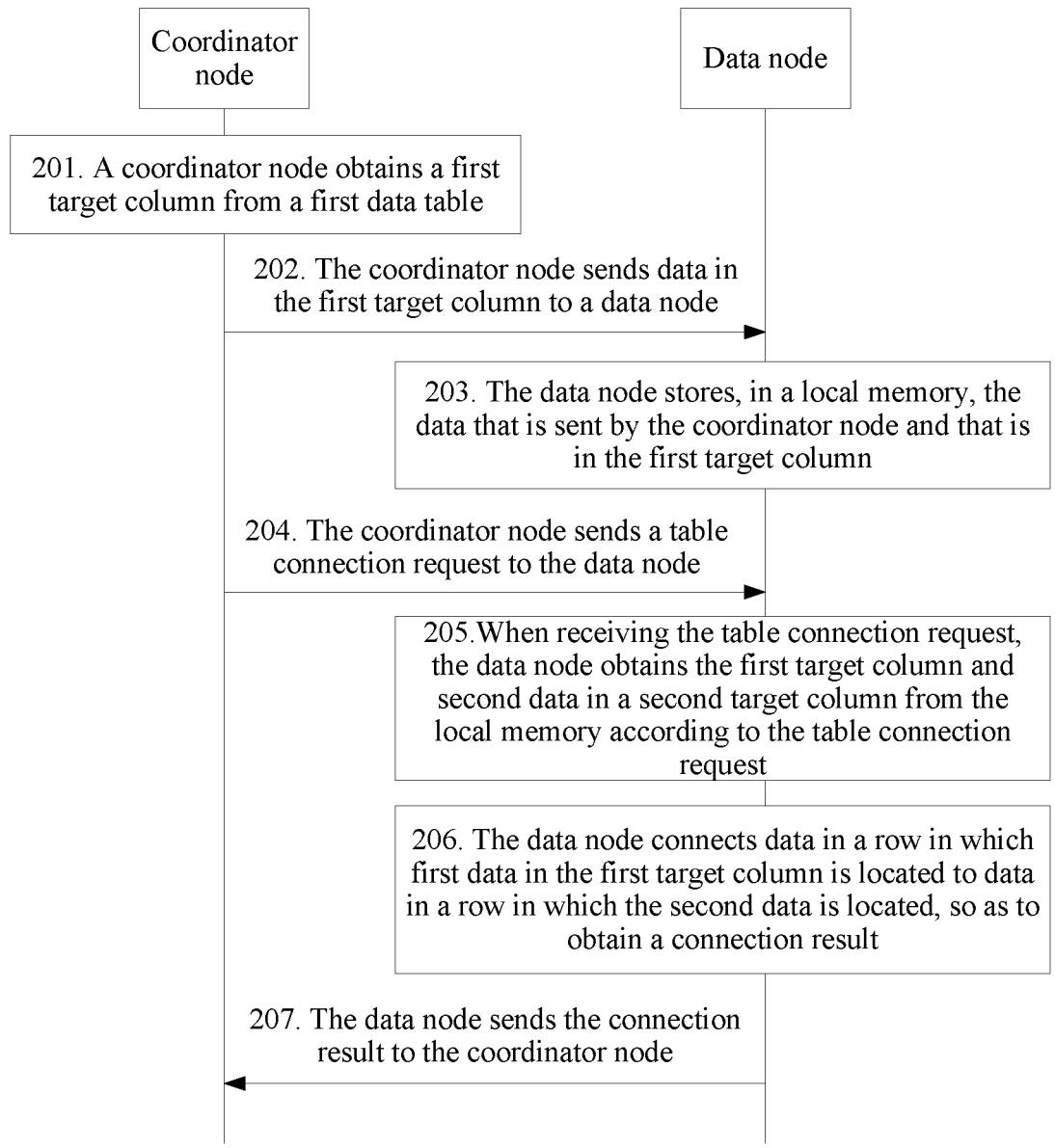
FIG. 2 is a flowchart of a table connection method in a distributed database system according to another embodiment of the present disclosure.
FIG. 3 is a schematic diagram of manners of storing a data table on different data nodes according to another embodiment of the present disclosure.

To shorten a network response time, reduce occupied resources on a coordinator node and a data node, and improve service performance, based on the distributed database system shown in FIG. 1, an embodiment of the present disclosure provides a table connection method in a distributed database system. Referring to FIG. 2, a procedure of the method provided in this embodiment of the present disclosure includes the following steps.

201. The coordinator node obtains a first target column from a first data table.

In the distributed database system, data in multiple data tables is stored on the data node, and data in each data table may be stored on each data node in a minimum unit of row, or may be stored on each data node in a minimum unit of column. This embodiment is described by using an example in which data in a data table is stored on each data node in a minimum unit of row. In an example of two to-be-connected data tables A and B, if the data table A includes 100 rows of data, the data table B includes 300 rows of data, and the distributed database system includes four data nodes, 25 rows of data in the data table A and 75 rows of data in the data table B are stored on each data node.

Generally, each data table includes attribute information of the data table, and the attribute information of the data table may reflect some features of the data table and data in the data table. In this embodiment, the attribute information of the data table includes a data amount of the data table and times of connecting each column in the data table to another data table, and may further include at least one of a create time point of the data table, an access time point of the data table, or another parameter. The data amount is storage space occupied when the data in the data table is stored. A larger data amount of the data table indicates larger storage space occupied when the data table is stored, and a smaller data amount of the data table indicates smaller storage space occupied when the data table is stored.

The coordinator node obtains attribute information of the two to-be-connected data tables, selects a data table with a smaller data amount from the two to-be-connected data tables as a first data table according to data amounts of the data tables, and uses the remaining data table as a second data table. The coordinator node obtains, according to times of connecting each column in the first data table to another data table, a column that is connected to the another data table more than preset times from the first data table, and uses the obtained column as a first target column in the first data table. Herein, it should be noted that, in the distributed database system in this embodiment, because data in the first data table and data in the second data table are stored on each data node in a unit of row, data in the first target column in the first data table and data in a second target column in second data table are stored on each data node in a scattered manner, that is, before the method provided in this embodiment is executed, each data node stores only a part of the data in the first target column and the second target column. The preset times are preset by the coordinator node according to a current service demand. For a specific method, refer to a related paragraph in the summary. For example, by means of calculation or setting, the preset times may be five times, six times, or eight times. Certainly, the preset times may be set in another manner, and this is not specifically limited in this application.

In an optional step, to distinguish different rows in a data table, each data table includes a distributed column, and the distributed column is a column in which a row identifier of the data table is located. In this embodiment, the first target column may be the same as a distributed column in the first data table, or may be different from a distributed column in the first data table. If the distributed column in the first data table is different from the first target column, to subsequently fill an empty row in an integrated data table obtained by using a connection result, the coordinator node further obtains the distributed column in the first data table.

For a process in which the coordinator node obtains the first target column and the distributed column in the first data table, the following uses an example in which the first data table is Table 1 for detailed description. Table 1 includes three columns, a first column is the distributed column, and the second column and the third column are non-distributed columns.

TABLE 1

| 1 | Linda | 80 |
| 2 | Tom   | 86 |
| 3 | Lucy  | 75 |
| 4 | Peter | 65 |
| 5 | John  | 49 |

The preset times are set as five times. If the first column is connected to another data table three times, the second column is connected to the another data table four times, and the third column is connected to the another data table six times, the third column is used as the first target column in the first data table. Because the third column is different from the distributed column in the first data table, the coordinator node further obtains the first column in Table 1.

202. The coordinator node sends data in the first target column to the data node.

In a possible implementation, after the first target column in the first data table is determined according to the times of connecting each column in the first data table to the another data table, the coordinator node further sends a first target column obtaining request to the data node, and the first target column obtaining request includes an identifier of the first data table and an identifier of the first target column. The data node receives the first target column obtaining request, obtains the data in the first target column from a local memory, and sends the obtained data in the first target column to the coordinator node. The coordinator node integrates data that is sent by multiple data nodes and that is in the first target column, so as to obtain all data in the first target column. In another possible implementation, when the coordinator node receives data that is uploaded by a client and that is in the first data table, after the first target column in the first data table is determined according to the times of connecting each column in the first data table to the another data table, the coordinator node may further store, in the local memory, the data in the first target column. Therefore, the coordinator node may directly obtain the data in the first target column from the local memory. After obtaining the data in the first target column, the coordinator node replicates the data in the first target column according to a quantity of data nodes, and sends replicated data in the first target column to the data node by using a network, or the like.

In an optional step, if the first target column is different from the distributed column in the first data table, the coordinator node replicates data in the distributed column according to a quantity of data nodes to which the data in the distributed column needs to be distributed, and sends the data in the distributed column to the data node by using a network, or the like.

203. The data node stores, in a local memory, the data that is sent by the coordinator node and that is in the first target column.

When receiving the first target column sent by the coordinator node, each data node stores the first target column in the local memory. Optionally, if the first target column is different from the distributed column, the data node further receives the data that is sent by the coordinator node and that is in the distributed column. After the data that is sent by the coordinator node and that is in the distributed column is received, the datanode stores, in the local memory, the data in the distributed column. In this case, the local memory stores not only at least one row of data in the first data table and at least one row of data in the second data table that are distributed by the coordinator node to the data node, but also the data in the first target column and the data in the distributed column. For example, Table 2 is the first data table, and it can be learned from Table 2 that the first data table includes three columns. The first column is the distributed column in the first data table, and the second column and the third column are non-distributed columns in the first data table. The coordinator node determines the first column as the first target column according to the times of connecting each column in the first data table to the another data table. It is assumed that the distributed database system includes three nodes: a DN 1, a DN 2, and a DN 3. For data stored on each data node, refer to FIG. 3.

TABLE 2

| 1 | abc | def |
| 2 | hij | klm |
| 3 | opq | rst |

In an optional step, to manage data that is stored in the local memory and that is in the first data table, after receiving the data in the distributed column, the data node may construct a base table based on the data in the distributed column and the data in the first data table. Data that is stored in the local memory and that is in each row in the first data table is added, according to a row identifier corresponding to the data in the row, to a row in which the row identifier is located in the base table. For a form of storing, on the data node, the data in the first data table, refer to FIG. 3.

204. The coordinator node sends a table connection request to the data node.

In an implementation, a person skilled in the art should understand that, according to a service demand, when a user needs to obtain a data table formed by connecting the first target column in the first data table to the second target column in the second data table, the user may trigger the client to generate the table connection request and send the generated table connection request to the coordinator node. The table connection request includes the identifier of the first data table, the identifier of the first target column, an identifier of the second data table, and an identifier of the second target column in the second data table, and further includes an address of the coordinator node, and the like. After receiving the table connection request sent by the client, the coordinator node sends the table connection request to the data node, so as to trigger the data node to return a result of connecting data in the first data table to data in the second data table. Certainly, in another implementation, the table connection request may be pre-stored on the coordinator node or may be entered by an administrator into the coordinator node. A source of the table connection request is not limited in this embodiment of the present disclosure.

205. When receiving the table connection request, the data node obtains the first target column and second data in a second target column from the local memory according to the table connection request.

After receiving the table connection request, the data node obtains, according to the identifier of the first data table, data corresponding to the identifier of the first data table from data stored in the local memory, and obtains, according to the identifier of the first target column, the data in the first target column from the data corresponding to the identifier of the first data table. The data node further obtains, according to the identifier of the second data table, data corresponding to the identifier of the second data table from the data stored in the local memory, and obtains, according to the identifier of the second target column, the second target column from the data corresponding to the identifier of the second data table. The second data may be one piece of data, or may be multiple pieces of data. A quantity of the second data is determined according to a quantity of rows of data that is stored on the data node and that is in the second data table. For example, if the data node stores two rows of data in the second data table, the second data is two pieces of data, or if the second data node stores five rows of data in the second data table, the second data is five pieces of data.

Herein, it should be noted that, because the data node stores the data in the first target column, data that is obtained by the data node and that is in the second target column is a complete column of data in the second target column. However, because the data node stores only at least one row of data in the second data table without storing all data in the second data table, the data that is obtained by the data node and that is in the second target column is merely a part of data in the second target column in the second data table.

206. The data node connects data in a row in which first data in the first target column is located to data in a row in which second data is located, so as to obtain a connection result.

In the distributed database system, for any two data tables such as a data table test1 (Table A) and a data table test2 (Table B), when a table connection request SELECT*FROM test1 A JOIN test2 B for connecting Table A to Table B according to a column a in Table A and a column b in Table B is received, the data node compares each piece of data in the column a in Table A with each piece of data in the column b in Table B. If data in the first row in the column a in Table A is the same as data in the third row in the column b in Table B, that is, A.a=B.b, it indicates that the first row in Table A can be successfully connected to the third row in Table B. In this case, data in the first row in Table A can be connected to data in the third row in Table B.

According to a data table connection principle, in this embodiment, when obtaining data in the first target column and data in the second target column, the data node compares each piece of data in the second target column with each piece of second data in the first target column, and when the first data in the first target column is the same as third data, connects data in a row in which the first data is located to data in a row in which the third data is located, so as to obtain a connection result. The first data is any data in the first target column. The third data is any data in the second data. In a possible implementation, when connecting the data in the row in which the first data table is located to the data in the row in which the third data is located, based on the pre-constructed base table, the data node may connect the data in the row in which the third data is located to the row in which the first data is located. For example, the data node inserts the data into a position behind the row in which the first data is located. Certainly, if the first data in the first target column is different from the second data in the second target column, the data node cannot obtain a connection result.

For the foregoing table connection process, to facilitate understanding, the following uses a specific example for description. The first data table is Table 3, the second data table is Table 4, the distributed column in the first data table is the first column, the first target column is the second column in Table 3, and the second target column is the second column in Table 4.

TABLE 3

| 1 | Lily | 20 |
| 2 | Lucy | 25 |
| 3 | Li Lei | 22 |

TABLE 4

| 1 | Lily | 90 |
| 2 | Lucy | 88 |
| 4 | Meimei | 89 |

The distributed database system includes three data nodes, and the three data nodes are a data node DN 1, a data node DN 2, and a data node DN 3 respectively. For data stored on each data node, refer to FIG. 4. The data node DN 1 stores data in the first column and the second column in the first data table, data in the first row in the first data table, and data in the first row in the second data table. The data node DN 2 stores the data in the first column and the second column in the first data table, data in the second row in the first data table, and data in the second row in the second data table. The data node DN 3 stores the data in the first column and the second column in the first data table, data in the third row in the first data table, and data in the third row in the second data table. Because data "Lily" in the first row in the second data table is the same as data "Lily" in the first row in the second column in the first data table, the data node DN 1 connects data in the first row in the first data table to data in the first row in the second data table, so as to obtain a connection result. Because data "Lucy" in the second row in the second data table is the same as data "Lucy" in the second row in the second column in the first data table, the data node DN 2 connects data in the second row in the first data table to data in the second row in the second data table, so as to obtain a connection result. Because data "Meimei" in the third row in the second column in the second data table is different from data "Li Lei" in the third row in the second column in the first data table, the data node DN 3 cannot connect data in the third row in the first data table to data in the third row in the second data table, and in this case, a connection result cannot be obtained.

207. The data node sends the connection result to the coordinator node.

After obtaining the connection result, the data node may send the connection result to the coordinator node by using a network, or the like.

It should be noted that, an example in which one data node in the distributed database system connects the first data table to the second data table is used in the foregoing. Actually, the distributed database system includes at least one data node, and a connection process of another data node is the same as the connection manner of the data node in the foregoing steps. For details, refer to a process in which the data node in the foregoing data nodes connects the first data table to the second data table, and details are not repeatedly described herein.

In this case, by performing step 201 to step 207, connection between the first data table and the second data table is implemented. On this basis, this embodiment further supports an optional step of processing the connection result sent by the data node. In an optional step, in the distributed database system, each data node sends a connection result to the coordinator node, and based on at least one received connection result, the coordinator node integrates the at least one connection result, so as to obtain an integrated data table. When performing integration, based on a connection result sent by one data node, the coordinator node may connect, to the connection result, a connection result sent by another data node, so as to obtain an integrated data table.

Because each data node stores only the data in the first target column (or the data in first target column and the data in the distributed column) in the first data table and at least one row of data that is allocated by the coordinator node and that is in the first data table without storing all data in the first data table, the following case may exist when the first data table is connected to the second data table: The second target column is the same as the first data in the first target column; however, data in a row in which the first data is located is not stored on the data node, the row in which the first data is located is an empty row, and in this case, an obtained connection result includes only data in a row in which second data is located. There is an empty row in an integrated data table obtained by the coordinator node by means of integration according to the connection result, thereby causing incomplete data in the integrated data table.

Further, to obtain a complete data table, when the coordinator node detects, in a row-by-row scanning manner, that there is an empty row in the integrated data table, the coordinator node determines an empty row identifier according to the distributed column in the first data table in the integrated data table, determines the empty row according to the empty row identifier, further determines, according to data allocation information stored when the data table is allocated, a data node on which the empty row is located, and sends a data obtaining request to the data node on which the empty row is located. The data obtaining request includes the empty row identifier, and further includes the identifier of the first data table, and the like. After receiving the data obtaining request, the data node on which the empty row is located obtains data in a row in which the empty row identifier is located from data that is stored in the local memory and that is in the first data table, and sends, to the coordinator node, the data in the row in which the empty row identifier is located. The coordinator node receives the data that is sent by the data node and that is in the row in which the empty row identifier is located, and adds the data in the row in which the empty row identifier is located to a row that is in the integrated data table and that is corresponding to the empty row identifier, so as to obtain a new data table.

For a process in which the coordinator node processes a connection result of each data node, the first data table is set as Table 2, and the second data table is set as Table 5. The first column in the first data table is the distributed column in the first data table, and the second column and the third column are non-distributed columns in the first data table.

For example, the first column in the first data table is connected to the first column in the second data table.

TABLE 5

| 1 | First grade  | Good      |
|---|--------------|-----------|
| 2 | Second grade | Pass      |
| 3 | Third grade  | Excellent |

Figure 5:
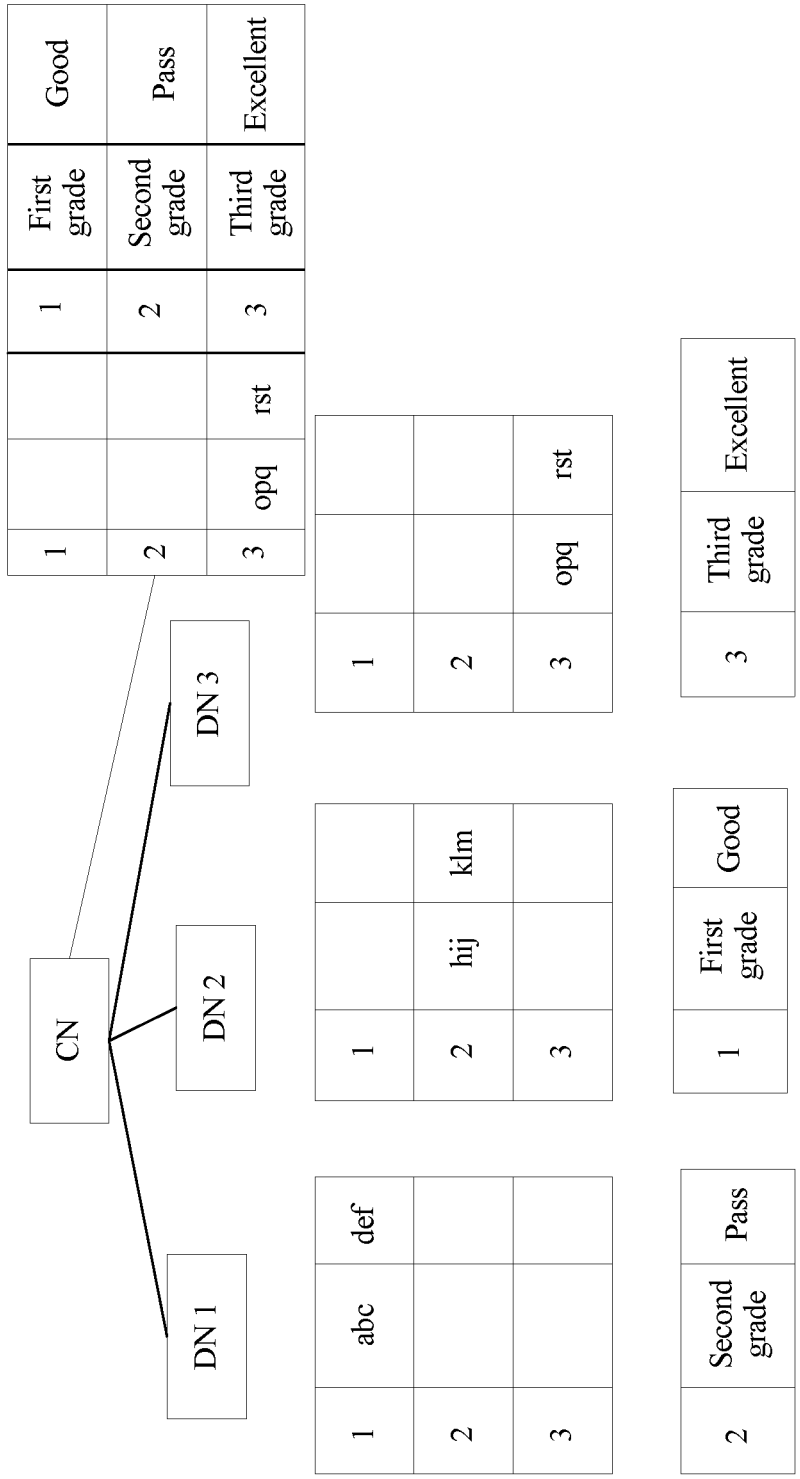
FIG. 5 is a schematic diagram of an integrated data table according to another embodiment of the present disclosure.

Referring to FIG. 5, the distributed database system includes three data nodes, and the three data nodes are a data node DN 1, a data node DN 2, and a data node DN 3 respectively. The data node DN 1 stores data in the first column in the first data table, data in the first row in the first data table, and data in the second row in the second data table. The data node DN 2 stores the data in the first column in the first data table, data in the second row in the first data table, and data in the first row in the second data table. The data node DN 3 stores the data in the first column in the first data table, data in the third row in the first data table, and data in the third row in the second data table. Because data in the second row in the first column in the second data table is the same as data in the second row in the first column in the first data table, the data node DN 1 connects data in the second row in the first data table to data in the second row in the second data table, so as to obtain a connection result. Because data in the first row in the first column in the second data table is the same as data in the first row in the first column in the first data table, the data node DN 2 connects data in the first row in the first data table to data in the first row in the second data table, so as to obtain a connection result. Because data in the third row in the first column in the second data table is the same as data in the third row in the first column in the first data table, the data node DN 3 connects data in the third row in the first data table to data in the third row in the second data table, so as to obtain a connection result. Each data node sends an obtained connection result to the coordinator node. After receiving connection results sent by the three data nodes, the coordinator node integrates the connection results sent by the three data nodes, so as to obtain an integrated data table. The integrated data table is shown in an upper-right figure in FIG. 5. The coordinator node scans the integrated data table, and detects that there is an empty row in the integrated data table. The coordinator node determines empty row identifiers as 1 and 2 according to the distributed column in the first data table; determines, according to data collocation information, that a data node corresponding to the empty row identifier 1 is the DN 1 and that a data node corresponding to the empty row identifier 2 is the DN 2; further sends a data obtaining request to the data node DN 1, where the data obtaining request includes the empty row identifier 1; and sends a data obtaining request to the data node DN 2, where the data obtaining request includes the empty row identifier 2. The data node DN 1 obtains data in the first row in which the empty row identifier 1 is located, and sends the obtained data in the first row to the coordinator node. The coordinator node adds the data in the first row to a row that is in the integrated data table and that is corresponding to the empty row identifier 1. The data node DN 2 obtains data in the second row in which the empty row identifier 2 is located, and sends the obtained data in the second row to the coordinator node. The coordinator node adds the data in the second row to a row that is in the integrated data table and that is corresponding to the empty row identifier 2, so as to finally obtain a new data table shown in FIG. 6.

An example in which data in a data table is stored on each data node in a minimum unit of row is used for description in the foregoing. When the data in the data table is stored on each data node in a minimum unit of column, a data table connection method in the distributed database system is the same as that in the implementation process of step 201 to step 208. A difference is that, in step 201 to step 208, data in different rows in the first data table and the second data table is connected according to data in a target column; however, when the data in the data table is stored on each data node in a minimum unit of column, data in different columns in the first data table and the second data table is connected according to data in a target row.

According to the method provided in this embodiment of the present disclosure, a data node locally stores a first target row that is selected by a coordinator node and that is in a first data table, and locally and directly connects data in the first data table to data in a second data table after receiving a table connection request for connecting the first target row in the first data table to a second target row in the second data table. Because data in a data table stored on a data node does not need to be sent to the coordinator node, not only an amount of transmitted data is reduced, a network response time is shortened, and service performance is improved, but also occupied storage resources of the coordinator node and the data node are reduced and storage space is reduced.

Figures 6, 7:
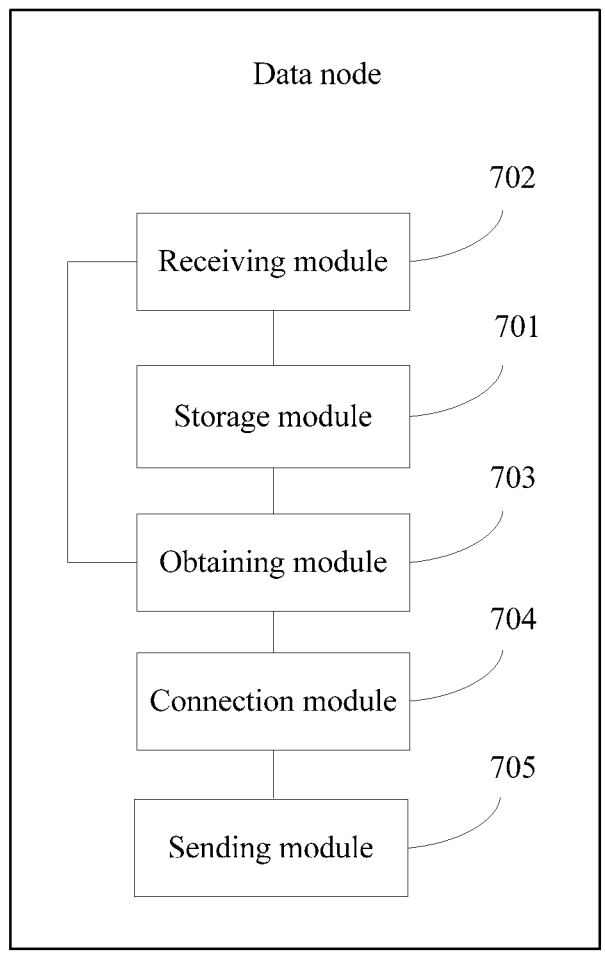
FIG. 6 is a schematic diagram of a new data table according to another embodiment of the present disclosure.
FIG. 7 is a schematic structural diagram of a data node according to another embodiment of the present disclosure.

Referring to FIG. 7, an embodiment of the present disclosure provides a data node, and the data node is located in a distributed database system. The distributed database system includes the data node and a coordinator node, and the data node includes: a storage module 701, configured to store, in a local memory, data that is sent by the coordinator node and that is in a first target column in a first data table, where the first target column is a column that is in the first data table and that is connected to another data table more than preset times; a receiving module 702, configured to receive a table connection request sent by the coordinator node, where the table connection request includes an identifier of the first data table, an identifier of the first target column, an identifier of a second data table, and an identifier of a second target column in the second data table; an obtaining module 703, configured to obtain the first target column and data in the second target column from the local memory according to the table connection request; a connection module 704, configured to connect data in a row in which first data in the first target column is located to data in a row in which second data is located, so as to obtain a connection result, where the first data is any data in the first target column, and the second data is the same as the first data; and a sending module 705, configured to send the connection result to the coordinator node.

In another embodiment of the present disclosure, the receiving module 702 is further configured to: when a distributed column in the first data table is different from the first target column, receive data that is sent by the coordinator node and that is in the distributed column, where the distributed column is a column in which a row identifier of the first data table is located.

Accordingly, the storage module 701 is further configured to store, in the local memory, the data in the distributed column.

In another embodiment of the present disclosure, the receiving module 702 is further configured to receive a data obtaining request sent by the coordinator node, where the data obtaining request indicates that there is an empty row in an integrated data table of the coordinator node, the integrated data table is obtained by the coordinator node by integrating a connection result sent by at least one data node, and the data obtaining request includes an empty row identifier.

The obtaining module 703 is further configured to obtain data in a row in which the empty row identifier is located.

The sending module 705 is configured to send the data in the row in which the empty row identifier is located to the coordinator node.

The receiving module 702 in this embodiment is configured to receive data sent by the coordinator node, the sending module 705 is configured to send data to the coordinator node, and functions of the receiving module 702 and the sending module 705 are to implement communication between the data node and the coordinator node. Actually, the receiving module 702 and the sending module 705 may be a communications module, and a data sending function and a data receiving function are integrated into the communications module. A specific implementation of each module is not limited in this application.

In addition, the data node shown in FIG. 7 can not only connect data in different rows in the first data table and the second data table according to data in a target column, but also connect data in different columns in the first data table and the second data table according to data in a target row. Details are not described in this embodiment.

The data node provided in this embodiment of the present disclosure locally stores a first target row that is selected by a coordinator node and that is in a first data table, and locally and directly connects data in the first data table to data in a second data table after receiving a table connection request for connecting the first target row in the first data table to a second target row in the second data table. Because data in a data table stored on a data node does not need to be sent to the coordinator node, not only an amount of transmitted data is reduced, a network response time is shortened, and service performance is improved, but also occupied storage resources of the coordinator node and the data node are reduced and storage space is reduced.

Figure 8:
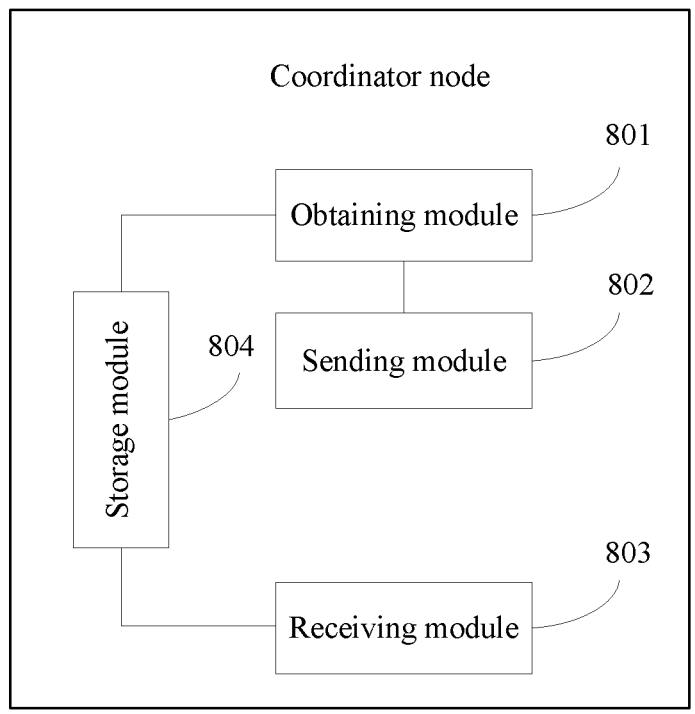
FIG. 8 is a schematic structural diagram of a coordinator node according to another embodiment of the present disclosure.

Referring to FIG. 8, an embodiment of the present disclosure provides a coordinator node, and the coordinator node includes: an obtaining module 801, configured to obtain a first target column from a first data table, where the first target column is a column that is connected to another data table more than preset times; a sending module 802, configured to: send data in the first target column to a data node; and send a table connection request to the data node, where the table connection request includes an identifier of the first data table, an identifier of the first target column, an identifier of a second data table, and an identifier of a second target column in the second data table, and the table connection request is used to trigger the data node to return a result of connecting data in the first data table to data in the second data table; and a receiving module 803, configured to receive the connection result sent by the data node.

In another embodiment of the present disclosure, the sending module 802 is further configured to: when a distributed column in the first data table is different from the first target column, send data in the distributed column to the data node, where the distributed column is a column in which a row identifier of the first data table is located.

A person skilled in the art should be able to figure out that, the coordinator node further includes a storage module 804, and the storage module 804 is configured to store a computer instruction, data sent by the data node, and the like. For ease of understanding and description, the storage module 804 is marked in FIG. 8 as an example.

In another embodiment of the present disclosure, the coordinator node further includes: an integration module, configured to integrate a connection result sent by at least one data node, so as to obtain an integrated data table; where the sending module 802 is further configured to: if there is an empty row in the integrated data table, send a data obtaining request to the data node, where the data obtaining request includes an empty row identifier, and the empty row identifier is determined according to the distributed column in the first data table; and the receiving module 803 is further configured to receive data that is sent by the data node and that is in a row in which the empty row identifier is located; and an adding module, configured to add the data in the row in which the empty row identifier is located to a row that is in the integrated data table and that is corresponding to the empty row identifier, so as to obtain a new data table.

The receiving module 803 in this embodiment is configured to receive data sent by the data node, the sending module 802 is configured to send data to the data node, and functions of the receiving module 803 and the sending module 802 are to implement communication between the data node and the coordinator node. Actually, the receiving module 803 and the sending module 802 may be a communications module, and a data sending function and a data receiving function are integrated into the communications module. In addition, the obtaining module 801 in this embodiment is configured to obtain the data in the first target column in the first data table, the integration module is configured to integrate at least one connection result, the adding module is configured to add the data in the row in which the empty row identifier is located to the integrated data table, and functions of the obtaining module 801, the integration module, and the adding module are to implement data processing. Actually, the obtaining module, the integration module, and the adding module may be a processing module, and a data processing function is integrated into the processing module.

In addition, the coordinator node shown in FIG. 8 can not only send data in a target column to the data node and receive a connection result obtained by the data node by connecting data in different rows in the first data table and the second data table according to the target column, but also send data in a target row to the data node and receive a connection result obtained by the data node by connecting data in different columns in the first data table and the second data table according to the data in the target row. Details are not described in this embodiment.

The coordinator node provided in this embodiment of the present disclosure locally stores a selected first target row in a first data table, and sends, to a data node, a table connection request for connecting the first target row in the first data table to a second target row in a second data table, so as to trigger the data node to locally and directly connect data in the first data table to data in the second data table. Because data in a data table stored on a data node does not need to be sent to the coordinator node, not only an amount of transmitted data is reduced, a network response time is shortened, and service performance is improved, but also occupied storage resources of the coordinator node and the data node are reduced and storage space is reduced.

Figure 9:
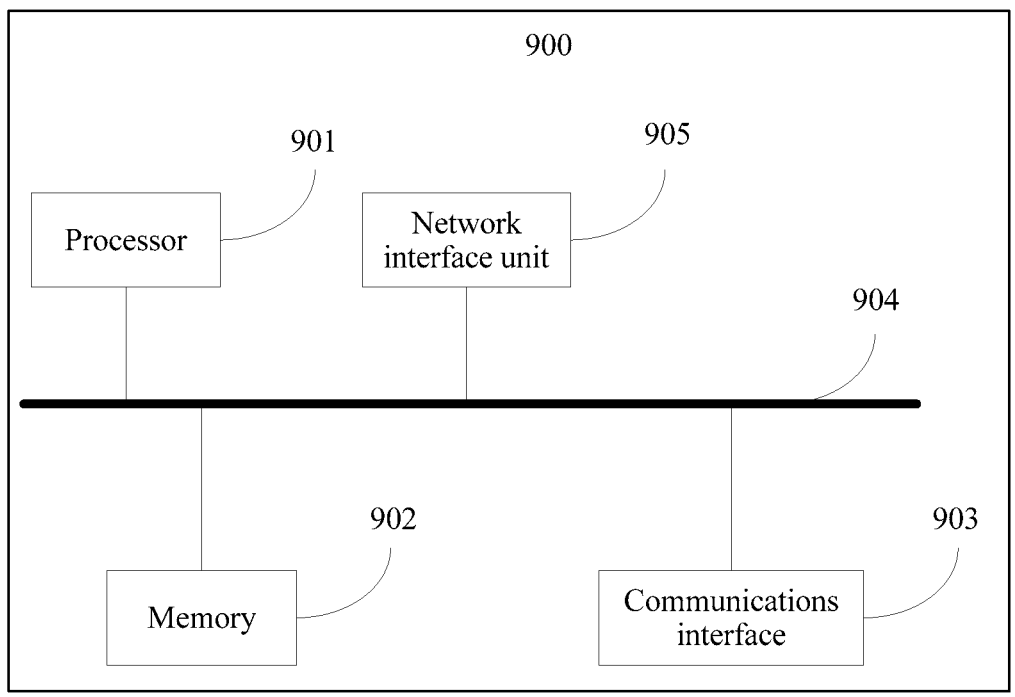
FIG. 9 shows an illustrative computer architecture of a computing device used in an embodiment of the present disclosure.

Referring to FIG. 9, FIG. 9 shows an illustrative computer architecture of a computing device 900 used in an embodiment of the present disclosure. The computing device 900 is a conventional desktop computer or a laptop notebook, and one or more computing devices 900 may form a physical platform. The computing device 900 includes a processor 901, a memory 902, a communications interface 903, and a bus 904. The processor 901, the memory 902, and the communications interface 903 are directly connected by using the bus 904. The computing device 900 may be a data node, and the computing device 900 is configured to execute the table connection method in the distributed database system that is executed by the data node in FIG. 7. In an embodiment, when the computing device executes the table connection method in the distributed database system that is executed by the data node in FIG. 7, it may be considered that the processor 901 has functions of the obtaining module 703 and the connection module 704, the memory 902 has a function of the storage module 701, and the communications interface 903 has functions of the receiving module 702 and the sending module 705.

The memory 902 is configured to: store a computer instruction, and store data that is sent by a coordinator node and that is in a first target column in a first data table, where the first target column is a column that is in the first data table and that is connected to another data table more than preset times.

The processor 901 invokes, by using the bus 904, the computer instruction stored in the memory, and is configured to perform the following operations: receiving, by invoking the communications interface 903, a table connection request sent by the coordinator node, where the table connection request includes an identifier of the first data table, an identifier of the first target column, an identifier of a second data table, and an identifier of a second target column in the second data table; obtaining the first target column and the second target column from the memory 902 according to the table connection request; and connecting data in a row in which first data in the first target column is located to data in a row in which second data is located, so as to obtain a connection result, where the first data is any data in the first target column, and the second data is the same as the first data; and sending the connection result to the coordinator node by invoking the communications interface 903.

In another embodiment of the present disclosure, when a distributed column in the first data table is different from the first target column, data that is sent by the coordinator node and that is in the distributed column is received by invoking the communications interface 903, and the distributed column is a column in which a row identifier of the first data table is located.

The memory 902 is further configured to store the data in the distributed column.

In another embodiment of the present disclosure, the processor 901 is further configured to receive, by invoking the communications interface 903, a data obtaining request sent by the coordinator node, where the data obtaining request indicates that there is an empty row in an integrated data table of the coordinator node, the integrated data table is obtained by the coordinator node by integrating a connection result sent by at least one data node, and the data obtaining request includes an empty row identifier.

The processor 901 is further configured to: obtain data in a row in which the empty row identifier is located; and send, by invoking the communications interface 903, the data in the row in which the empty row identifier is located to the coordinator node.

Generally, the memory 902 includes a computer storage medium. The computer storage medium includes a volatile, non-volatile, removable, or irremovable medium that is configured to store information such as a computer readable instruction, a data structure, a program module, or other data and that is implemented by using any method or technology. The computer storage medium includes a RAM, a ROM, an EPROM, an EEPROM, a flash memory, another solid-state storage technology, a CD-ROM, a DVD, another optical memory, a cassette, a magnetic tape, a magnetic disk memory, or another magnetic storage device. Certainly, a person skilled in the art may learn that the computer storage medium is not limited to the foregoing.

According to embodiments of the present disclosure, the computing device 900 may further run by being connected to a remote computer in a network by using the network such as the Internet. That is, the computing device 900 may be connected to the network by using a network interface unit 905 connected to the bus 904, or may be connected to a network of another type or a remote computer system (not shown) by using a network interface unit 905.

It should be noted that, when the computing device 900 is the data node, the computing device 900 shown in FIG. 9 can not only connect data in different rows in the first data table and the second data table according to data in a target column, but also connect data in different columns in the first data table and the second data table according to data in a target row. Details are not described in this embodiment.

An example in which the computing device 900 is the data node is used for description in the foregoing. Actually, the computing device 900 may be the coordinator node, and when the computing device is the coordinator node, the computing device 900 is configured to execute the table connection method in the distributed database system that is executed by the coordinator node in FIG. 8. In an embodiment, when the computing device executes the table connection method in the distributed database system that is executed by the coordinator node in FIG. 8, it may be considered that, the processor 901 has functions of the obtaining module 801, the integration module, and the adding module, the memory 902 has a function of the storage module, and the communications interface 903 has functions of the receiving module 803 and the sending module 802.

The memory 902 is configured to store a computer instruction.

The processor 901 invokes, by using the bus 904, the computer instruction stored in the memory 902, and is configured to perform the following operations: obtaining a first target column from a first data table, where the first target column is a column that is connected to another data table more than preset times; and sending data in the first target column to a data node by invoking the communications interface 903; sending a table connection request to the data node, where the table connection request includes an identifier of the first data table, an identifier of the first target column, an identifier of a second data table, and an identifier of a second target column in the second data table, and the table connection request is used to trigger the data node to return a result of connecting data in the first data table to data in the second data table; and receiving the connection result sent by the data node.

In another embodiment of the present disclosure, the processor 901 is further configured to: when a distributed column in the first data table is different from the first target column, send data in the distributed column to the data node by invoking the communications interface 903, where the distributed column is a column in which a row identifier of the first data table is located.

In another embodiment of the present disclosure, the processor 901 is further configured to integrate a connection result sent by at least one data node, so as to obtain an integrated data table.

The processor 901 is further configured to: if there is an empty row in the integrated data table, send, by invoking the communications interface 903, a data obtaining request to a data node corresponding to the empty row, where the data obtaining request includes an empty row identifier, and the empty row identifier is determined according to the distributed column in the first data table; and receive data that is sent by the data node corresponding to the empty row and that is in a row in which the empty row identifier is located.

The processor 901 is further configured to add the data in the row in which the empty row identifier is located to a row that is in the integrated data table and that is corresponding to the empty row identifier, so as to obtain a new data table.

It should be noted that, when the computing device 900 is the coordinator node, the computing device 900 shown in FIG. 9 can not only send data in a target column to the data node and receive a connection result obtained by the data node by connecting data in different rows in the first data table and the second data table according to the target column, but also send data in a target row to the data node and receive a connection result obtained by the data node by connecting data in different columns in the first data table and the second data table according to the data in the target row. Details are not described in this embodiment.

In conclusion, according to the computing device provided in this embodiment of the present disclosure, a data node locally stores a first target column that is selected by a coordinator node and that is in a first data table, and locally and directly connects data in the first data table to data in a second data table after receiving a table connection request for connecting the first target column in the first data table to a second target column in the second data table. Because data in a data table stored on a data node does not need to be sent to the coordinator node, not only an amount of transmitted data is reduced, a network response time is shortened, and service performance is improved, but also occupied storage resources of the coordinator node and the data node are reduced and storage space is reduced.

It should be noted that, when data tables are connected in the distributed database system provided in the foregoing embodiment, division of the foregoing function modules is merely used as an example for description. In practical application, the foregoing functions may be allocated to different function modules for implementation according to a requirement. That is, an internal structure of the distributed database system is divided into different function modules to implement all or a part of the functions described above. In addition, the table connection method in the distributed database system provided in the foregoing embodiment pertains to a same concept as the distributed database system embodiment. For a specific implementation process, refer to the method embodiment. Details are not repeatedly described herein.

A person of ordinary skill in the art may understand that all or some of the steps of the embodiments may be implemented by hardware or a program instructing related hardware. The program may be stored in a computer-readable storage medium.

The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A table connection method in a distributed database system, wherein the distributed database system comprises a data node and a coordinator node, the method is applied to the data node, and the method comprises:
   storing, in a local memory, data that is sent by the coordinator node and that is in a first target column in a first data table, wherein the first target column is a column that is in the first data table and that is connected to another data table more than a preset number of times, and wherein the preset number of times is preset by the coordinator node;
   receiving a table connection request sent by the coordinator node, wherein the table connection request comprises an identifier of the first data table, an identifier of the first target column, an identifier of a second data table, and an identifier of a second target column in the second data table, and wherein the first data table has a smaller data amount than the second data table;
   obtaining the first target column and second data in the second target column from the local memory according to the table connection request;
   connecting data in a row in which first data in the first target column is located to data in a row in which the second data is located to obtain a connection result, wherein the first data is any data in the first target column, and the second data is the same as the first data; and
   sending the connection result to the coordinator node.

2. The method according to claim 1, wherein the method further comprises:
   when a distributed column in the first data table is different from the first target column, receiving data that is sent by the coordinator node and that is in the distributed column, wherein the distributed column is a column in which a row identifier of the first data table is located; and
   storing, in the local memory, the data in the distributed column.

3. The method according to claim 1, wherein the method further comprises:
   receiving a data obtaining request sent by the coordinator node, wherein the data obtaining request indicates that there is an empty row in an integrated data table of the coordinator node, the integrated data table is obtained by the coordinator node by integrating a connection result sent by at least one data node, and the data obtaining request comprises an empty row identifier;
   obtaining data in a row in which the empty row identifier is located; and
   sending the data in the row in which the empty row identifier is located to the coordinator node.

4. The method according to claim 1, wherein the method further comprises:
   storing, in the local memory, data that is sent by the coordinator node and that is in a first target row in a first data table, wherein the first target row is a row that is in the first data table and that is connected to another data table more than the preset number of times;
   receiving a second table connection request sent by the coordinator node, wherein the second table connection request comprises the identifier of the first data table, an identifier of the first target row, the identifier of the second data table, and an identifier of a second target row in the second data table;

obtaining the first target row and the second target row from the local memory according to the second table connection request;

connecting data in a column in which first data in the first target row is located to data in a column in which second data in the second target row is located to obtain a second connection result, wherein the first data in the first target row is any data in the first target row, and the second data in the second target row is the same as the first data in the first target row; and sending the second connection result to the coordinator node.

5. The method according to claim 4, wherein the method further comprises:

when a distributed row in the first data table is different from the first target row, receiving data that is sent by the coordinator node and that is in the distributed row, wherein the distributed row is a row in which a column identifier of the first data table is located; and storing, in the local memory, the data that is sent by the coordinator node and that is in the distributed row in the distributed row.

6. The method according to claim 4, wherein the method further comprises:

receiving a data obtaining request sent by the coordinator node, wherein the data obtaining request indicates that there is an empty column in an integrated data table of the coordinator node, the integrated data table is obtained by the coordinator node by integrating a connection result sent by at least one data node, and the data obtaining request comprises an empty column identifier;

obtaining data in a column in which the empty column identifier is located; and sending the data in the column in which the empty column identifier is located to the coordinator node.

7. A computing device, comprising: at least one processor, a memory, a communications interface, and a bus, wherein the memory, the at least one processor, and the communications interface are connected using the bus;

the memory is configured to: store a computer instruction, and store data that is sent by a coordinator node and that is in a first target column in a first data table, wherein the first target column is a column that is in the first data table and that is connected to another data table more than a preset number of times, and wherein the preset number of times is preset by the coordinator node; and the computer instruction instructs the at least one processor to perform the following operations:

receiving a table connection request sent by the coordinator node, wherein the table connection request comprises an identifier of the first data table, an identifier of the first target column, an identifier of a second data table, and an identifier of a second target column in the second data table, and wherein the first data table has a smaller data amount than the second data table;

obtaining the first target column and the second target column from the memory according to the table connection request; and connecting data in a row in which first data in the first target column is located to data in a row in which second data in the second target column is located to obtain a connection result, wherein the first data is any data in the first target column, and the second data is the same as the first data; and sending the connection result to the coordinator node.

8. The computing device according to claim 7, wherein the computer instruction instructs the at least one processor to: when a distributed column in the first data table is different from the first target column, receive data that is sent by the coordinator node and that is in the distributed column, wherein the distributed column is a column in which a row identifier of the first data table is located; and the memory is further configured to store the data in the distributed column.

9. The computing device according to claim 7, wherein the computer instruction instructs the at least one processor to:

receive a data obtaining request sent by the coordinator node, wherein the data obtaining request indicates that there is an empty row in an integrated data table of the coordinator node, the integrated data table is obtained by the coordinator node by integrating a connection result sent by at least one data node, and the data obtaining request comprises an empty row identifier;

obtain data in a row in which the empty row identifier is located; and send the data in the row in which the empty row identifier is located to the coordinator node.

10. The computing device according to claim 7, wherein the memory is further configured to: store a second computer instruction, and store data that is sent by the coordinator node and that is in a first target row in a first data table, wherein the first target row is a row that is in the first data table and that is connected to another data table more than the preset number of times; and wherein the second computer instruction instructs the at least one processor to perform the following operations:

receiving a second table connection request sent by the coordinator node, wherein the second table connection request comprises the identifier of the first data table, an identifier of the first target row, the identifier of the second data table, and an identifier of a second target row in the second data table;

obtaining the first target row and the second target row from the memory according to the second table connection request; and connecting data in a column in which first data in the first target row is located to data in a column in which second data in the second target row is located to obtain a second connection result, wherein the first data in the first target row is any data in the first target row, and the second data in the second target row is the same as the first data in the first target row; and sending the second connection result to the coordinator node.

11. The computing device according to claim 10, wherein the second computer instruction instructs the at least one processor to: when a distributed row in the first data table is different from the first target row, receive data that is sent by the coordinator node and that is in the distributed row, wherein the distributed row is a row in which a column identifier of the first data table is located; and the memory is further configured to store the data that is sent by the coordinator node and that is in the distributed row in the distributed row.

12. The computing device according to claim 10, wherein the second computer instruction instructs the at least one processor to:

receive a data obtaining request sent by the coordinator node, wherein the data obtaining request indicates that there is an empty column in an integrated data table of the coordinator node, the integrated data table is obtained by the coordinator node by integrating a connection result sent by at least one data node, and the data obtaining request comprises an empty column identifier;

obtain data in a column in which the empty column identifier is located; and send the data in the column in which the empty column identifier is located to the coordinator node.

13. A distributed database system, wherein the system comprises a data node and a coordinator node;

the coordinator node is configured to:

obtain a first target row from a first data table, wherein the first target row is a row that is connected to another data table more than a preset number of times, and wherein the preset number of times is preset by the coordinator node; and send data in the first target row to the data node;

the data node is configured to store, in a local memory, the data that is sent by the coordinator node and that is in the first target row in the first data table;

the coordinator node is further configured to send a table connection request to the data node, wherein the table connection request comprises an identifier of the first data table, an identifier of the first target row, an identifier of a second data table, and an identifier of a second target row in the second data table, and wherein the first data table has a smaller data amount than the second data table;

the data node is further configured to:

obtain the first target row and the second target row from the local memory according to the table connection request; and connect data in a column in which first data in the first target row is located to data in a column in which second data in the second target row is located to obtain a connection result, wherein the first data is any data in the first target row, and the second data is the same as the first data; and the coordinator node is further configured to receive the connection result sent by the data node.

14. The system according to claim 13, wherein the coordinator node is further configured to: if a distributed row in the first data table is different from the first target row, send data in the distributed row to the data node, wherein the distributed row is a row in which a column identifier of the first data table is located; and the data node is configured to receive the data that is sent by the coordinator node and that is in the distributed row.

15. The system according to claim 13, wherein the coordinator node is further configured to:

integrate a connection result sent by at least one data node to obtain an integrated data table; and if there is an empty column in the integrated data table, send a data obtaining request to the data node, wherein the data obtaining request comprises an empty column identifier, and the empty column identifier is determined according to a distributed row in the first data table;

the data node is further configured to:

receive the data obtaining request sent by the coordinator node;

obtain data in a column in which the empty column identifier is located; and send the data in the column in which the empty column identifier is located to the coordinator node; and the coordinator node is further configured to:

receive the data that is sent by the data node and that is in the column in which the empty column identifier is located; and add the data in the column in which the empty column identifier is located to a column that is in the integrated data table and that corresponds to the empty column identifier to obtain a new data table.

16. The system according to claim 13, wherein the coordinator node is configured to:

obtain a first target column from a first data table, wherein the first target column is a column that is connected to another data table more than the preset number of times; and send data in the first target column to the data node;

the data node is configured to store, in the local memory, the data that is sent by the coordinator node and that is in the first target column in the first data table;

the coordinator node is further configured to send a second table connection request to the data node, wherein the table connection request comprises the identifier of the first data table, an identifier of the first target column, the identifier of the second data table, and an identifier of a second target column in the second data table;

the data node is further configured to:

obtain the first target column and the second target column from the local memory according to the second table connection request; and connect data in a row in which first data in the first target column is located to data in a row in which second data in the second target column is located to obtain a second connection result, wherein the first data in the first target column is any data in the first target column, and the second data in the second target column is the same as the first data in the first target column; and the coordinator node is further configured to receive the second connection result sent by the data node.

17. The system according to claim 16, wherein the coordinator node is further configured to: when a distributed column in the first data table is different from the first target column, send data in the distributed column to the data node, wherein the distributed column is a column in which a row identifier of the first data table is located; and the data node is further configured to receive the data that is sent by the coordinator node and that is in the distributed column.

18. The system according to claim 16, wherein the coordinator node is further configured to:

integrate a connection result sent by at least one data node to obtain an integrated data table; and if there is an empty row in the integrated data table, send a data obtaining request to the data node, wherein the data obtaining request comprises an empty row identifier, and the empty row identifier is determined according to a distributed column in the first data table;

the data node is further configured to:

receive the data obtaining request sent by the coordinator node;

obtain data in a row in which the empty row identifier is located; and send the data in the row in which the empty row identifier is located to the coordinator node; and the coordinator node is further configured to:

receive the data that is sent by the data node and that is in the row in which the empty row identifier is located; and add the data in the row in which the empty row identifier is located to a row that is in the integrated data table and that corresponds to the empty row identifier to obtain a new data table.

* * * * *